US006872926B1

(12) United States Patent
Arntz et al.

(10) Patent No.: US 6,872,926 B1
(45) Date of Patent: Mar. 29, 2005

(54) RAPID COOK OVEN WITH DUAL FLOW FAN ASSEMBLY

(75) Inventors: Timothy J. Arntz, Cleveland, TN (US); Dennis Michael Brandon Burns, Athens, TN (US); Sondra Denice Proffitt, Springfield, TN (US); Herbert Dustin Sims, Cleveland, TN (US); William Darryl Sneed, Cleveland, TN (US); Robert Z. Whipple, Jr., Louden, TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/784,975

(22) Filed: Feb. 25, 2004

(51) Int. Cl.[7] .............................. H05B 6/80; A21B 1/26
(52) U.S. Cl. ........................ 219/681; 219/400; 219/757; 126/21 A
(58) Field of Search ................................ 219/680–685, 219/757, 400, 401; 126/21 A; 99/473–476, 451

(56) References Cited

U.S. PATENT DOCUMENTS

| | | | | | |
|---|---|---|---|---|---|
| 4,283,614 | A | * | 8/1981 | Tanaka et al. | 219/681 |
| 4,395,233 | A | | 7/1983 | Smith et al. | |
| 4,430,541 | A | | 2/1984 | Day, Jr. | |
| 4,431,889 | A | | 2/1984 | Saponara et al. | |
| 4,481,396 | A | | 11/1984 | Matsubayashi et al. | |
| 4,516,012 | A | | 5/1985 | Smith et al. | |
| 4,555,606 | A | | 11/1985 | Thomas et al. | |
| 4,780,596 | A | * | 10/1988 | Matsushima et al. | 219/400 |
| 4,831,225 | A | | 5/1989 | Ishifuro et al. | |
| 4,867,132 | A | | 9/1989 | Yencha | |
| 5,121,737 | A | | 6/1992 | Yencha, III | |
| 5,361,749 | A | | 11/1994 | Smith et al. | |
| 5,485,780 | A | * | 1/1996 | Koether et al. | 219/400 |
| 5,558,793 | A | | 9/1996 | McKee et al. | |
| 5,655,511 | A | | 8/1997 | Prabhu et al. | |
| 6,060,701 | A | | 5/2000 | McKee et al. | |
| 6,723,970 | B1 | * | 4/2004 | Whipple, Jr. | 219/681 |

* cited by examiner

*Primary Examiner*—Philip H. Leung
(74) *Attorney, Agent, or Firm*—Diederiks & Whitelaw, PLC

(57) ABSTRACT

A rapid cook convection oven is constructed to efficiently cook a food item by breaking down a thermal insulation layer maintained about the food, while effectively removing contaminates from within a convection air flow. The rapid cook oven preferably includes both a microwave cooking system and a convection cooking system. The convection cooking system is provided with a dual flow fan adapted to simultaneously draw in an oven air flow from a cooking chamber and a fresh air flow from the surroundings. In order to reduce the presence of contaminates and, by extension, smoke, the two air flows are combined in a mixing chamber and passed over a heating element arranged within a combustion chamber prior to re-entry into the cooking chamber.

19 Claims, 2 Drawing Sheets

RAPID COOK OVEN WITH DUAL FLOW FAN ASSEMBLY

BACKGROUND OF THE INVENTION

1. Field of the Invention

The present invention pertains to the art of cooking appliances, and more particularly, to a rapid cooking appliance including a convection cooking system having a dual flow fan or blower assembly.

2. Discussion of the Prior Art

In always striving to improve cooking appliances, manufacturers are developing cooking appliances which are capable of performing cooking processes in less time than traditional, standard thermal cooking appliances. For instance, it is known to decrease cooking time by directing forced air streams over the food item during the cooking process. The prior art actually contains several examples of producing forced air streams within an oven cavity.

One method taught by the prior art is to recirculate hot air contained within an oven cavity. This technique utilizes a fan and duct system which draws in hot oven air and subsequently redirects a forced, hot air flow back into the cooking chamber. Another method taught by the prior art is the use of a dual flow fan draws in air from the oven cavity and combines that air with a second, heated air flow. The combined, heated air flow is then redirected into the cooking chamber. The heated air flow is produced by passing the second air flow over a heat source, such as a gas burner. While each of the above methods are effective, their ability to substantially affect the thermal insulation layer around the food item is rather limited.

In addition to reducing cooking time by directing forced air flows into the cooking chamber, many manufactures are incorporating microwave technology to supplement the more traditional cooking systems. However, a drawback exists in that during cooking, contaminants in the form of food byproducts, e.g. fat particles, grease particles and the like, develop in the cooking chamber. These contaminants evolve into smoke or are deposited on interior surfaces of the cooking chamber, as well as interior surfaces of ductwork which carries the flow of air. In an effort to address this problem, manufacturers have designed systems that maintain the byproducts solely within the confines of the cooking chamber. In this fashion, grease build-up in the ducting can be minimized. However this does not address the problem of smoke and deposit building up within the cooking chamber. In any case, the presence of contaminates and, by extension smoke, will affect the efficiency of the microwave cooking system.

Accordingly, there exists a need in the art for a rapid cook oven that can more efficiently perform a cooking process. Particularly, a rapid cook oven that can more efficiently break down the thermal insulation layer about food being cooked, as well as reduce the amount of contaminants maintained within a circulating air flow.

SUMMARY OF THE INVENTION

The present invention is directed to a rapid cook oven which can more efficiently cook a food item by breaking down a thermal insulation layer maintained about the food, as well as by removing contaminates from within a convection air flow. In accordance with one embodiment of the invention, the rapid cook oven includes a microwave cooking system and a convection cooking system. The convection cooking is system is provided with a dual flow fan assembly arranged to draw in both an oven air flow from a cooking chamber and a fresh air flow from the surrounding environment. The two air flows are combined in a mixing chamber and passed over a heating element arranged within a combustion chamber prior to their introduction into the cooking chamber. By extending the time the air flow remains in the mixing chamber, the heating element provides a continuous pyrolytic combustion environment for the air flow. In this manner, contaminates carried by the air flow are subjected to a longer combustion process which substantially eliminates any contaminates.

In accordance with this arrangement, turbulent, high speed air current, having an initial temperature lower than an average oven temperature, is directed into the cooking chamber. As the lower temperature air flow impinges upon the food item, the thermal insulation layer formed about the food item is disrupted. Through testing it has been shown that the larger the temperature differential between the forced air flow and the thermal insulation layer, the more pronounced the effect upon the heat energy transfer to the food. Therefore, by providing the lower temperature, high speed air currents, the food is actually cooked in less time than standard thermal or convection cooking techniques.

As discussed above, the rapid cook oven of the present invention further improves cooking efficiency by removing a substantial portion of contaminates carried by the air flow. By passing the air flow over a heating element, contaminates or food byproducts carried by the air flow can be combusted prior to introduction into the cooking chamber. In this manner, smoke and other byproducts are reduced, thereby increasing the overall efficiency of the appliance.

In accordance with another embodiment, a portion of the cooking process is performed by a microwave cooking system. More specifically, the high speed air currents are preferably combined, with a varying intensity microwave energy field to further decrease the time required to cook the food item.

In any event, the rapid cook oven of the present invention represents a more efficient arrangement which will enable a consumer to more effectively carry out various cooking processes. Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
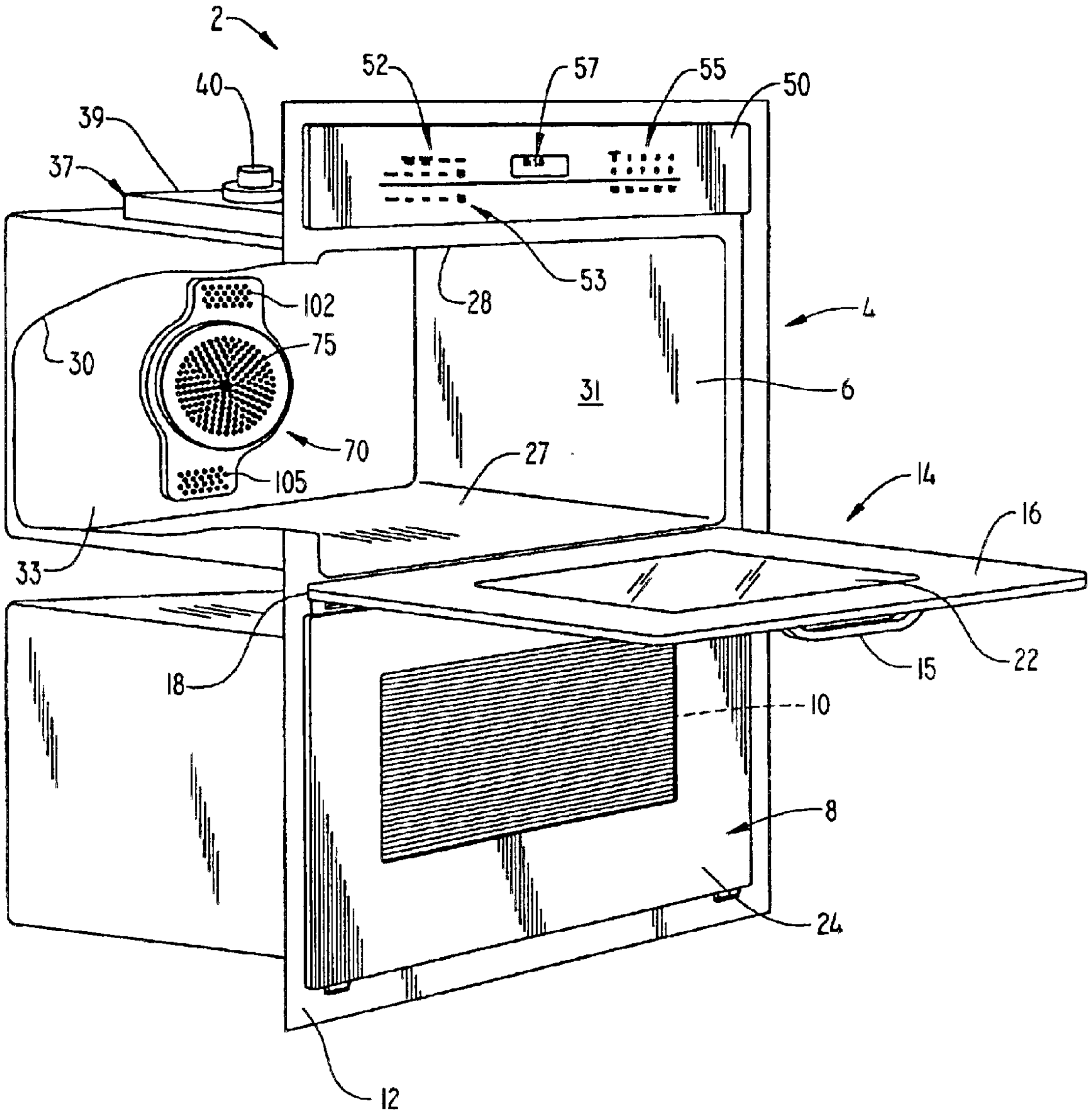
FIG. 1 is a perspective view of a rapid cook oven including a dual flow fan assembly constructed in accordance with the present invention.

With initial reference to FIG. 1, a rapid cook oven incorporating a convection cooking system having a dual flow fan assembly constructed in accordance with the present invention is generally shown at 2. Although the actual cooking appliance 2 into which the convection cooking system assembly can be incorporated may vary, the invention is shown in connection with a dual wall oven. In the embodiment shown, cooking appliance 2 includes an upper oven 4 including upper cooking chamber or cavity 6 and a lower oven 8 including a lower cooking chamber or cavity 10. In the embodiment shown, upper oven 4 is provided to perform a combination microwave/convection cooking process, and lower oven 8 is provided to perform a standard non-convection cooking operation. As shown cooking appliance 2 includes outer frame 12 for supporting both the upper cooking chamber 6 and lower cooking chamber 10.

In a manner known in the art, a door assembly 14 is provided to selectively provide access to upper cooking chamber 6. As shown, door assembly 14 is provided with a handle 15 at an upper portion 16 thereof. Door assembly 14 is adapted to pivot at a lower portion 18 to enable selective access to within cooking chamber 6. In a manner also known in the art, door 14 is provided with a transparent zone 22 for viewing the contents of cooking chamber 6 while door 14 is closed. In addition, a seal (not shown) is provided about a peripheral edge of door assembly 14 to prevent oven gases from escaping from cooking chamber 6. In a similar arrangement, a second door assembly 24 is provided for lower oven 8.

As best seen in FIG. 1, cooking chamber 6 is defined by a bottom portion 27, an upper portion 28, opposing side portions 30 and 31 and rear portion 33. In a preferred embodiment, arranged above cooking chamber 6 is a microwave cooking system 37. As shown, microwave cooking system includes a waveguide 39 having arranged thereon a microwave emitter 40. Although cooking appliance 2 is depicted as a wall oven, it should be understood that the present invention not limited to this model type and can be incorporated into various types of oven configurations, e.g., cabinet mounted ovens, slide-in ranges and free standing ranges.

Further shown in FIG. 1, cooking appliance 2 includes an upper control panel 50. In the embodiment shown, control panel 50 includes first and second rows of oven control buttons 52 and 53 for programming, in combination with a numeric pad 55 and a display 57, particular cooking operations for upper and lower ovens 4 and 8 respectively. Since the general programming and operation of cooking appliance 2 is known in the art and does not form part of the present invention, these features will not be discussed further here.

In general, the structure described above with respect to cooking appliance 2 is already known in the art and does not constitute part of the present invention. Therefore, this structure has only been described for the sake of completeness. Instead, the present invention is particularly directed to the convection cooking system including a dual flow fan assembly 70 shown arranged on rear portion 33 of cooking chamber 6.

Figure 2:
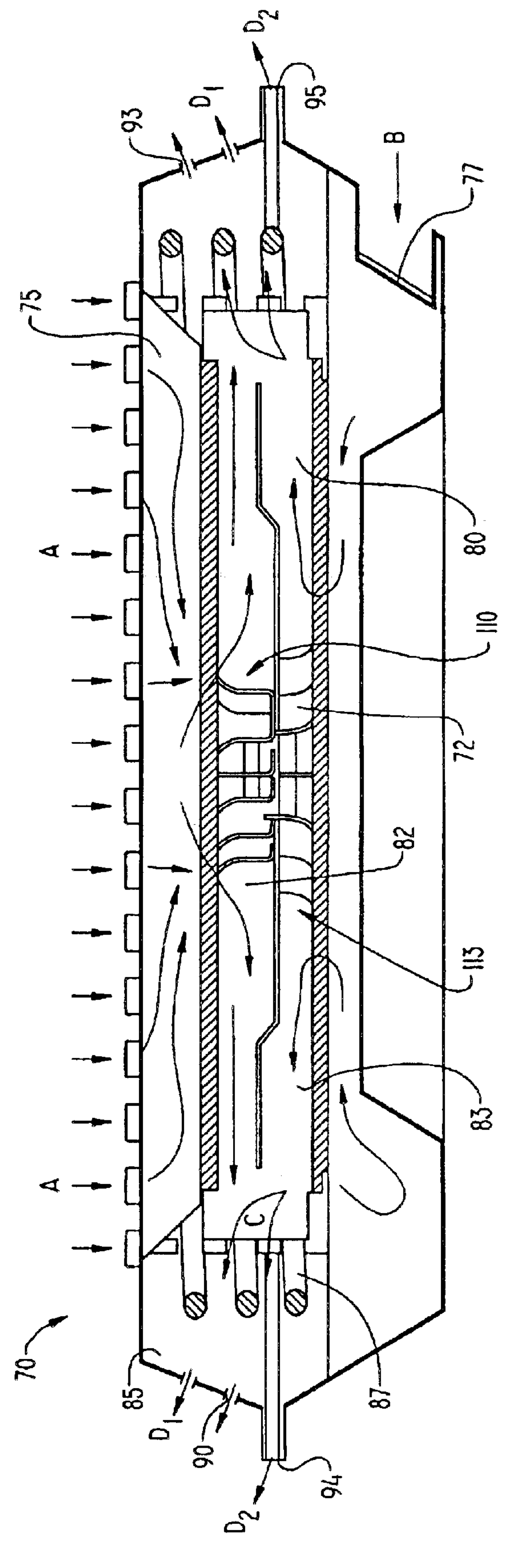
FIG. 2 is a cut-away view of the dual flow fan assembly of FIG. 1 showing the air flow paths within the fan assembly.

As best seen in FIG. 2, dual flow fan assembly 70 includes a dual flow fan 72, an oven air inlet 75, a fresh air inlet 77, a mixing chamber 80 and an annular combustion chamber 85. As shown, mixing chamber 80 includes a first side 82 adapted to receive an oven air flow, and a second side 83 adapted to receive a fresh air flow. Arranged within combustion chamber 85, a sheathed, resistive electric heating element 87. As will be detailed more fully below, heating element 87 functions to aid in the combustion of food byproducts carried by an oven air flow A. As shown, heating element 87 takes the form of a halo disposed about the outer periphery of dual flow fan 72 within combustion chamber 85.

In accordance with one form of the present invention, fan assembly 70 further includes a plurality of recirculation or return ducts 90 and 93, as well as exhaust ducts 94 and 95. More specifically, recirculation ducts 90 and 93 direct the air flow into upper and lower recirculation discharge ports 102 and 105 (see FIG. 1) respectively. Exhaust ducts 94 and 95 are provided to discharge a portion of the air flow to the surroundings. As will be detailed more fully below, dual flow fan 72 includes a first portion 110 arranged within first side 82 of mixing chamber 80, and a second portion 113 arranged within second side 83 of mixing chamber 80.

Having described a particular construction of fan assembly 70, a preferred method of operation will be described below. Upon initiation of a cooking process, a motor (not shown) drives dual flow fan 72 to establish a convection air flow within cooking chamber 6. Particularly, oven air or first side 82 of dual flow fan 72 draws in heated oven air A, including cooking byproducts, in through oven air inlets 75 to mixing chamber 80. Simultaneously, fresh air or second side 83 of dual flow fan 72 draws fresh, ambient air B in through fresh air inlets 77 to mixing chamber 80. The two air flows A and B combine within mixing chamber 80. Once in mixing chamber 80, the heated oven air A is cooled by the incoming fresh air B thereby establishing a tempered, contaminant laden, air flow C.

In a preferred form of the invention, tempered air flow C is directed into and then circulated in a turbulent manner around combustion chamber 85. In this manner, tempered air flow C is exposed to the pyrolytic effects of halo heating element 87. In accordance with one form of the present invention, heating element 87 serves to burn-off or combust a substantial portion of the cooking byproducts carried by air flow C. Specifically, heating element 87 provides a continuous pyrolytic combustion environment for air flow C which results in the normal byproducts of combustion.

After passing through combustion chamber 85, a high speed convection air flow or air current D, substantially free of contaminates, is formed. Preferably, convection air flow D diverges into two flow paths constituted by return ducts 90 and 93 and exhaust ducts 94 and 95. In accordance with a preferred embodiment of the present invention, a portion $D_1$ of convection air flow D is introduced into cooking chamber 6 through upper and lower discharge ports 102 and 105. In addition to the portion of air flow $D_1$ directed into cooking chamber 6, a second, substantially smaller portion $D_2$ of the convection air flow D is exhausted to the surroundings through a discharge ducts 94 and 95. Since only a small portion $D_2$ of the overall air flow D is exhausted, the contaminates carried by the air flow are retained within combustion chamber 85 for a longer period of time thereby increasing the exposure of the contaminates to the halo element 87.

With this arrangement, the overall cook time is reduced through the introduction of the high speed air currents produced by air flow $D_1$ discharging into cooking chamber 6. As set forth above, the high speed air currents break down the thermal insulation layer disposed about the food item being cooked. As such, the energy transfer rate between the food item and the air currents is increased, causing the initial reduction in cooking time. In addition, the byproducts are consumed to substantially reduce the occurrence of smoke within cooking chamber 6. In fact, it has been found that the invention substantially improves upon a standard convection system and even has the added benefit that the normal bake element on or below the bottom of the cooking chamber can be eliminated. In a more preferred form of the invention, the above described convection cooking system is coupled with a microwave cooking system as discussed with reference to FIG. 1. The combination of a varying intensity microwave energy field and the high speed air currents, with or without a baking element, further serves to decrease the amount of time required to perform a cooking operation.

Although described with reference to a preferred embodiment of the invention, it should be readily understood that various changes and/or modifications can be made to the invention without departing from the spirit thereof. For instance, the particular mounting location of the dual flow fan assembly may be varied without departing from the scope of the present invention. Additionally, the particular arrangement of the microwave cooking system can be varied to include different types of waveguide, magnetron and overall mounting arrangements. In general, the invention is only intended to be limited by the scope of the following claims.

We claim:

1. A rapid cook oven comprising:
- an oven cavity including an interior portion, and an open frontal portion; and
- a convection cooking system for use in heating the oven cavity during a cooking operation, said convection cooking system including:
  - a housing;
  - an oven air passage enabling a flow of oven air into the housing;
  - a fresh air passage enabling a flow of fresh air into the housing;
  - a mixing chamber adapted to receive each of the flow of oven air and the flow of fresh air;
  - a combustion chamber defined in the housing;
  - an electric heating element positioned in the combustion chamber;
  - a recirculation passage adapted to pass a combined oven air flow mixture composed of the flow of oven air and the flow of fresh ambient air from the housing and into the oven cavity; and
  - a dual flow fan rotatably mounted in the housing, said dual flow fan including a first portion arranged to draw in the flow of oven air and a second portion arranged to draw in the flow of fresh air, wherein operation of the dual flow fan combines the flow of oven air and the flow of fresh air and directs the combined air flow into the oven cavity through the combustion chamber in which the combined air flow is passed over the heating element such that food byproducts contained within the combined air flow are consumed.

2. The rapid cook oven as recited in claim 1, wherein the combustion chamber extends annularly about the dual flow fan.

3. The rapid cook oven according to claim 2, wherein the electric heating element is constituted by a sheathed electric resistive heating element.

4. The rapid cook oven as recited in claim 3, wherein the electric heating element is a halo element including a plurality of substantially circular coils extending within the combustion chamber.

5. The rapid cook oven as recited in claim 1, further comprising: an exhaust air duct for exhausting air from the housing.

6. The rapid cook oven as recited in claim 5, wherein a portion of the combined air flow is exhausted through the exhaust air duct.

7. The rapid cook oven as recited in claim 6, wherein the exhaust air duct extends through the combustion chamber.

8. The rapid cook oven as recited in claim 1, further comprising: a microwave cooking system including a microwave generator and a waveguide for directing microwave energy into the cooking cavity.

9. A convection fan assembly for use in a convection cooking appliance comprising:
- a housing;
- an oven air passage adapted to receive a flow of oven air into the housing;
- a fresh air passage enabling a flow of fresh air into the housing;
- a mixing chamber adapted to receive each of the flow of oven air and the flow of fresh air;
- a combustion chamber defined in the housing;
- an electric heating element positioned in the combustion chamber;
- a recirculation passage adapted to pass a combined oven air flow mixture composed of the flow of oven air and the flow of fresh ambient air from the housing; and
- a dual flow fan rotatably mounted in the housing, said dual flow fan including a first portion arranged to draw in the flow of oven air and a second portion arranged to draw in the flow of fresh air, wherein operation of the dual flow fan combines the flow of oven air and the flow of fresh air and directs the combined air flow from the housing through the combustion chamber in which the combined air flow is passed over the heating element.

10. The convection fan assembly as recited in claim 9, wherein the combustion chamber extends annularly about the dual flow fan.

11. The convection fan assembly as recited in claim 10, wherein the electric heating element is constituted by a sheathed electric resistive heating element.

12. The convection fan assembly as recited in claim 11, wherein the electric heating element is a halo element including a plurality of substantially circular coils extending within the combustion chamber.

13. The convection fan assembly as recited in claim 9, further comprising: an exhaust air duct for exhausting air from the housing.

14. The convection fan assembly as recited in claim 13, wherein a portion of the combined air flow is exhausted through the exhaust air duct.

15. The convection fan assembly as recited in claim 14, wherein the exhaust air duct extends through the combustion chamber.

16. A method of performing an accelerated cooking operation in a rapid cook oven having an oven cavity and a convection cooking system comprising:
- placing a food item within the oven cavity;
- operating a dual flow fan having a first portion which draws in a flow of oven air having a first temperature from the oven cavity, and a second portion which draw in a flow of fresh air flow having a second temperature;
- mixing the flow of oven air and the flow of fresh air in a mixing chamber forming a combined air flow having a temperature less than the first temperature;
- directing the combined air flow into a combustion chamber having an electric heating element arranged therein;
- heating the combined air flow with the electric heating element;
- maintaining the combined air flow in the combustion chamber such that contaminates carried by the combined air flow are combusted to create a substantially clean, recirculation air flow; and
- directing the recirculation air flow into the oven cavity such that the recirculation air flow is directed upon the food item during the rapid cooking operation.

17. The method of claim 16, further comprising: activating a microwave cooking system to perform at least a portion of the cooking operation.

18. The method of claim 16, further comprising: exhausting a portion of the combined air flow.

19. The method of claim 18, wherein the portion of the combined air flow which is exhausted flows through the combustion chamber.

* * * * *